United States Patent
Pepper et al.

(10) Patent No.: US 12,421,962 B2
(45) Date of Patent: *Sep. 23, 2025

(54) HYDRAULIC POWER PACK WITH ADJUSTABLE MOUNTING ARRANGEMENT

(71) Applicant: Eaton Intelligent Power Limited, Dublin (IE)

(72) Inventors: Joshua Boone Pepper, Madison, MS (US); David E. Korba, Wiggins, MS (US); Brady Powell Dearing, Canton, MS (US); Eugene Mikhailovich Grigoriev, Lyndhurst, OH (US); Kelly Dale Valtr, Aurora, TX (US); Stephen Marshall Devan, Madison, MS (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,335

(22) Filed: Oct. 17, 2023

(65) Prior Publication Data

US 2024/0141892 A1    May 2, 2024

Related U.S. Application Data

(63) Continuation of application No. 17/737,619, filed on May 5, 2022, now Pat. No. 11,821,419.

(Continued)

(51) Int. Cl.
| | |
|---|---|
| *F04B 53/22* | (2006.01) |
| *F04B 23/02* | (2006.01) |
| *F04B 53/00* | (2006.01) |
| *F04B 53/20* | (2006.01) |
| *F16M 11/10* | (2006.01) |
| *F04B 17/03* | (2006.01) |
| *F04B 53/06* | (2006.01) |

(52) U.S. Cl.
CPC ............ *F04B 53/22* (2013.01); *F04B 23/025* (2013.01); *F04B 53/003* (2013.01); *F04B 53/20* (2013.01); *F16M 11/10* (2013.01); *F04B 17/03* (2013.01); *F04B 53/06* (2013.01)

(58) Field of Classification Search
CPC ...... F04B 23/025; F04B 53/003; F04B 53/22; F16M 11/10
See application file for complete search history.

(56) References Cited

U.S. PATENT DOCUMENTS

| | | |
|---|---|---|
| 1,722,273 A | 7/1929 | Buvinger et al. |
| 3,487,431 A | 12/1969 | Forkner |

(Continued)

FOREIGN PATENT DOCUMENTS

DE     102006017011 A1 *  10/2007  ............. B62D 5/064

OTHER PUBLICATIONS

DE 102006017011 A1 machine translation (Year: 2007).*

*Primary Examiner* — Matthew Wiblin
(74) *Attorney, Agent, or Firm* — MERCHANT & GOULD P.C.

(57) ABSTRACT

The present disclosure relates to a hydraulic power pack arrangement that can be configured in multiple different mounting configurations. The hydraulic power pack arrangement can include a bracket assembly for mounting a hydraulic power pack core assembly and a hydraulic reservoir assembly at a mounting location such as a floor, wall, or ceiling of an aircraft.

19 Claims, 14 Drawing Sheets

Related U.S. Application Data

(60) Provisional application No. 63/184,542, filed on May 5, 2021.

(56) References Cited

U.S. PATENT DOCUMENTS

| | | |
|---|---|---|
| 3,708,977 A | 1/1973 | Raymond |
| 5,030,067 A | 7/1991 | Ushiota et al. |
| 10,563,490 B2 | 2/2020 | Ladron de Guevara Rangel |
| 11,821,419 B2 * | 11/2023 | Pepper .................... F04B 53/20 |
| 2010/0290929 A1 | 11/2010 | Ohi et al. |
| 2012/0164010 A1 * | 6/2012 | Pascual .................... F04B 17/03 |
| | | 417/410.5 |
| 2018/0313350 A1 | 11/2018 | Dawson et al. |
| 2022/0356875 A1 | 11/2022 | Pepper et al. |

* cited by examiner

HYDRAULIC POWER PACK WITH ADJUSTABLE MOUNTING ARRANGEMENT

CROSS-REFERENCE TO RELATED APPLICATION

This application is a continuation of U.S. patent application Ser. No. 17/737,619, filed on May 5, 2022, which claims the benefit of U.S. Patent Application Ser. No. 63/184,542, filed on May 5, 2021, the disclosures of which are incorporated herein by reference in their entireties. To the extent appropriate, a claim of priority is made to each of the above disclosed applications.

TECHNICAL FIELD

The present disclosure relates generally to hydraulic power systems such as hydraulic power systems used to actuate components on an aircraft.

BACKGROUND

Traditionally components on an aircraft such as the primary flight control components (e.g., ailerons, rudder and elevator), the secondary flight control components (e.g., flaps, trimming devices, spoilers, slats, slots and speed brakes) and other components such as the landing gear have been actuated with a centralized hydraulic system. Hydraulic power packs have been used to provide backup control of certain aircraft components and have been considered for use in providing primary control of certain aircraft components. Hydraulic power packs often require different mounting configurations depending upon where in the aircraft the power packs are intended to be mounted and for which use the hydraulic power packs are intended.

SUMMARY

One aspect of the present disclosure relates to a hydraulic power pack arrangement that can be configured in multiple different mounting configurations. Having an adjustable mounting arrangement allows the hydraulic power pack to be functionally designed to meet customer specifications before being tied to a particular mounting configuration. Thus, design work for the hydraulic power pack arrangement can be initiated before the customer identifies a specific mounting location or mounting configuration for the arrangement. Hence, the ability of the hydraulic power pack arrangement to be adjusted between different mounting configurations can be beneficial in lowering design cost and reducing time to market.

Another aspect of the present disclosure relates to a hydraulic power pack arrangement including a hydraulic power pack core assembly, a hydraulic reservoir assembly for providing hydraulic fluid to the hydraulic power pack core assembly, and a mounting bracket assembly adapted for coupling the hydraulic power pack core assembly and the hydraulic reservoir assembly together as a unit and for mounting the entire unit at a mounting location (e.g., at a location on an aircraft). In a preferred example, the hydraulic power pack core assembly and the hydraulic reservoir assembly are rotationally adjustable relative to the mounting bracket arrangement to allow the unit to be set at multiple different mounting configurations. In one example, the multiple different mounting configurations can include a floor mount configuration, a ceiling mount configuration and a wall mount configuration.

Another aspect of the present disclosure relates to a hydraulic power pack arrangement including a mounting bracket arrangement for mounting a hydraulic power pack core assembly and a hydraulic reservoir assembly together at a desired location within an aircraft. The hydraulic power pack core assembly is elongate along a core length that extends along a first axis. The hydraulic power pack core assembly includes an electric motor and a hydraulic pump rotating group adapted to be rotated by the electric motor. The hydraulic power pack core assembly engages with the mounting bracket arrangement in such a manner that a rotational orientation of the hydraulic power pack core assembly is rotationally adjustable relative to the mounting bracket arrangement about the first axis. The hydraulic reservoir assembly is adapted to provide hydraulic fluid to the hydraulic power pack core assembly. The hydraulic reservoir assembly is elongate along a reservoir length that extends along a second axis. The hydraulic reservoir assembly engages with the mounting bracket arrangement in such a manner that a rotational orientation of the hydraulic reservoir assembly is rotationally adjustable relative to the mounting bracket arrangement about the second axis. In one example, the first and second axes are parallel to one another. The rotational adjustability of the hydraulic power pack core assembly and the hydraulic reservoir assembly allows the hydraulic power pack arrangement to be set at multiple different mounting configurations. In one example, the different mounting configurations include a floor mount configuration, a ceiling mount configuration and a wall mount configuration.

Another aspect of the present disclosure relates to a hydraulic power pack arrangement including first and second base brackets each having a length that extends between opposite first and second ends. Each of the first and second base brackets includes first and second saddles spaced-apart along the length. The first and second brackets are arranged spaced-apart and parallel with respect to one another with the first saddles aligned along a first axis and the second saddles aligned along a second axis. The first and second axes are parallel with respect to one another. The first and second base brackets also include mounting feet located adjacent to the first and second ends of the first and second base brackets. Vibration isolators can be secured to the mounting feet. The first and second saddles have open sides that face away from the mounting feet. The hydraulic power pack arrangement also includes a hydraulic power pack core assembly that is elongate along a core length. The hydraulic power pack core assembly includes an electric motor and a hydraulic pump rotating group adapted to be rotated by the electric motor. The hydraulic power pack core assembly is mounted within the first saddles of the first and second base brackets with the core length extending along the first axis. A rotational orientation of the hydraulic power pack core assembly is rotationally adjustable relative to the first and second base brackets about the first axis. The hydraulic power pack arrangement also includes a hydraulic reservoir assembly for providing hydraulic fluid to the hydraulic power pack core assembly. The hydraulic reservoir assembly is elongate along a reservoir length. The hydraulic reservoir assembly is mounted within the second saddles of the first and second base brackets with the reservoir length extending along the second axis. A rotational orientation of the hydraulic reservoir assembly is rotationally adjustable relative to the first and second base brackets about the second axis.

These and other features and advantages will be apparent from a reading of the following detailed description and a review of the associated drawings. A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
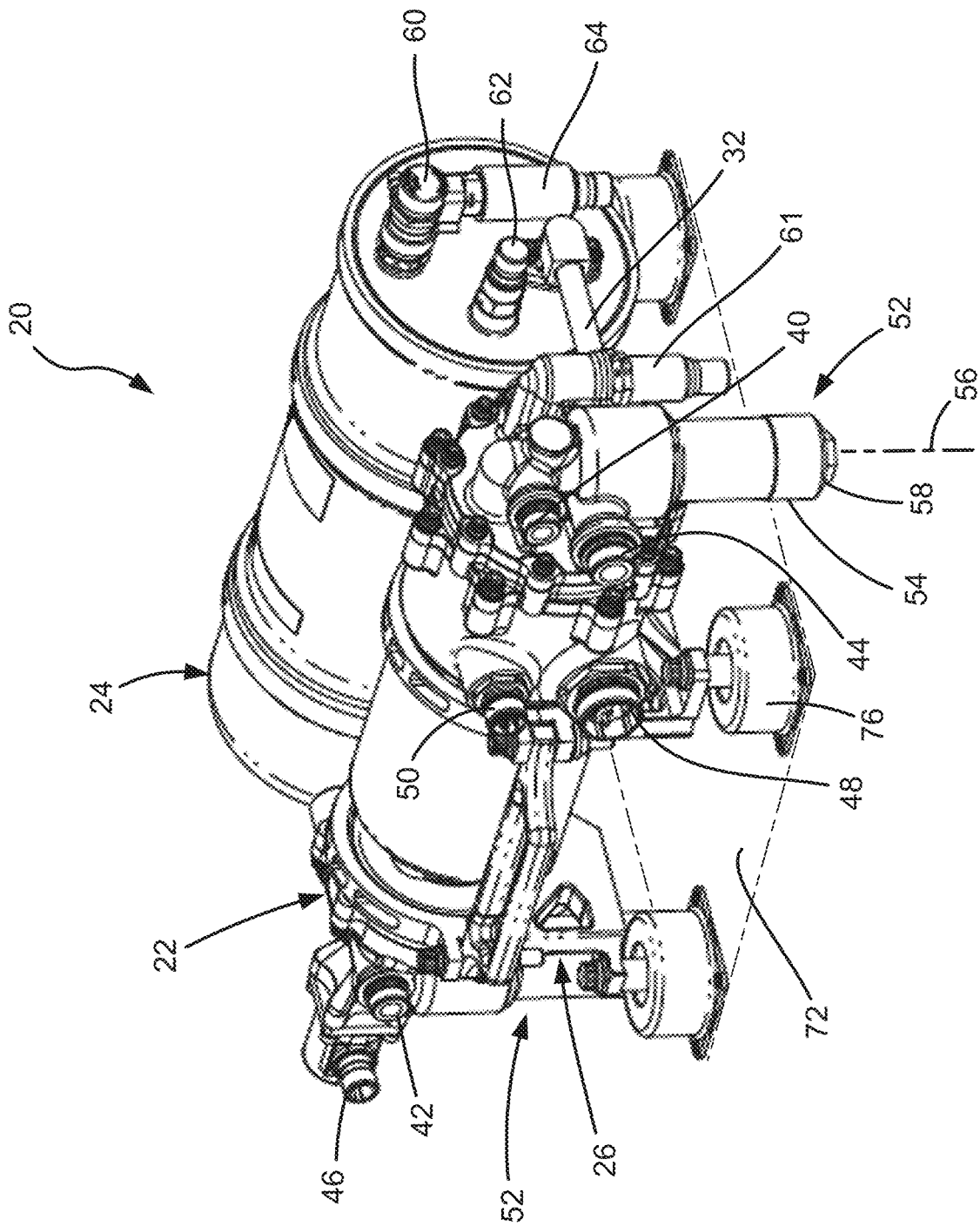
FIG. 1 is a first perspective view of a hydraulic power pack arrangement in accordance with the principles of the present disclosure, the hydraulic power pack arrangement is shown in a floor mount configuration.
Figure 2:
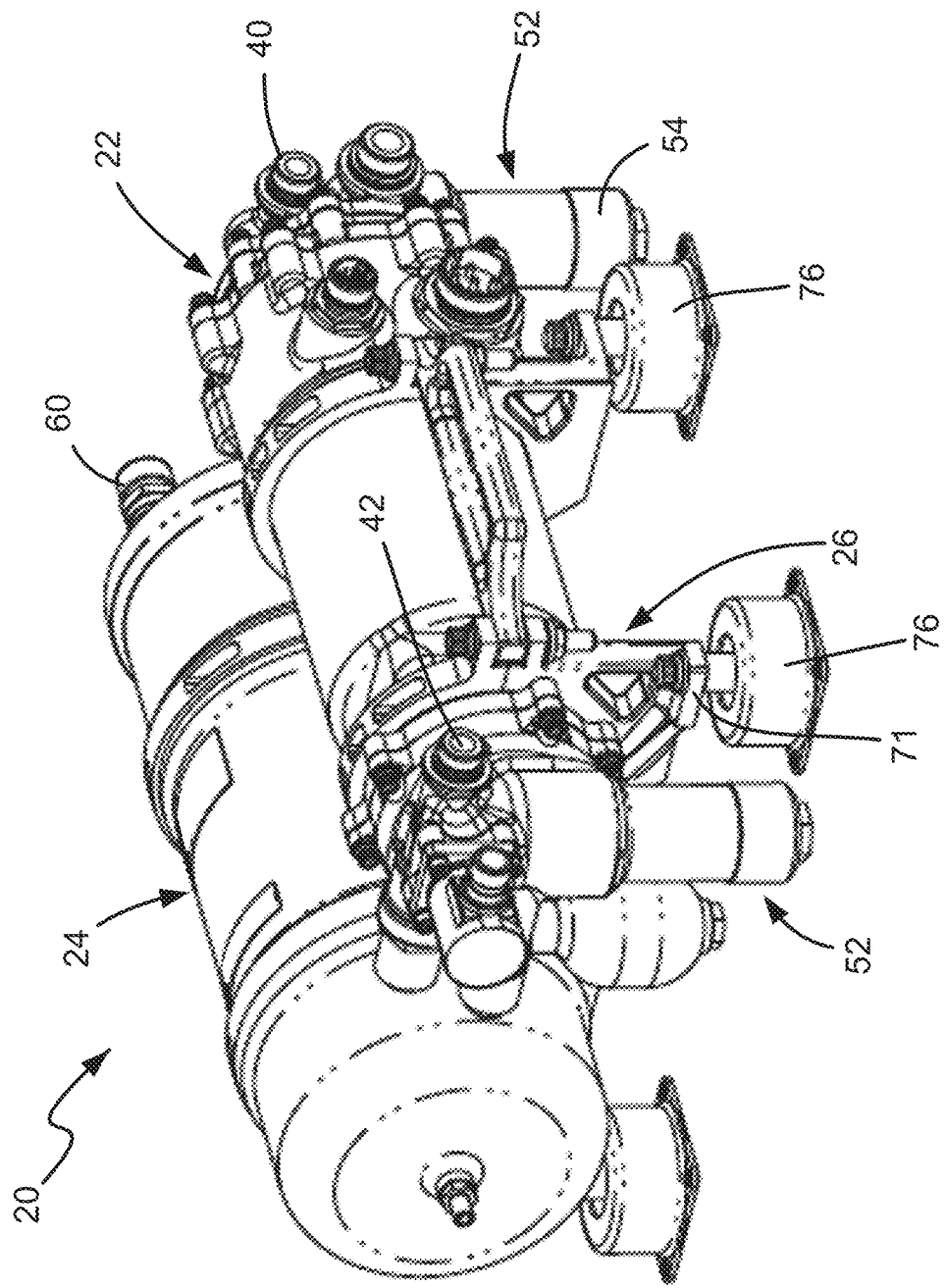
FIG. 2 is an opposite second perspective view of the hydraulic power pack arrangement of FIG. 1.
Figure 3:
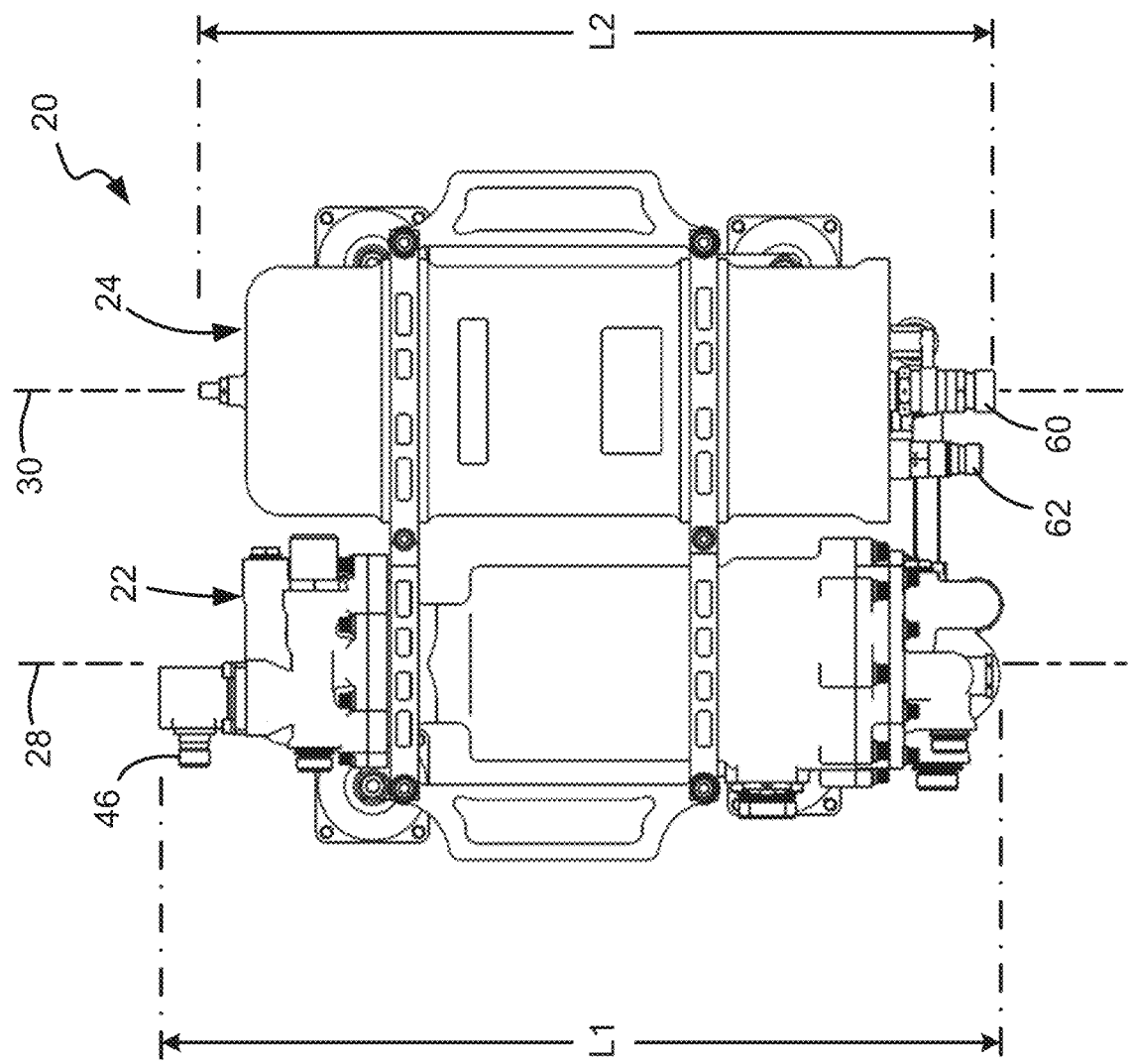
FIG. 3 is a top view of the hydraulic power pack arrangement of FIG. 1.
Figure 4:
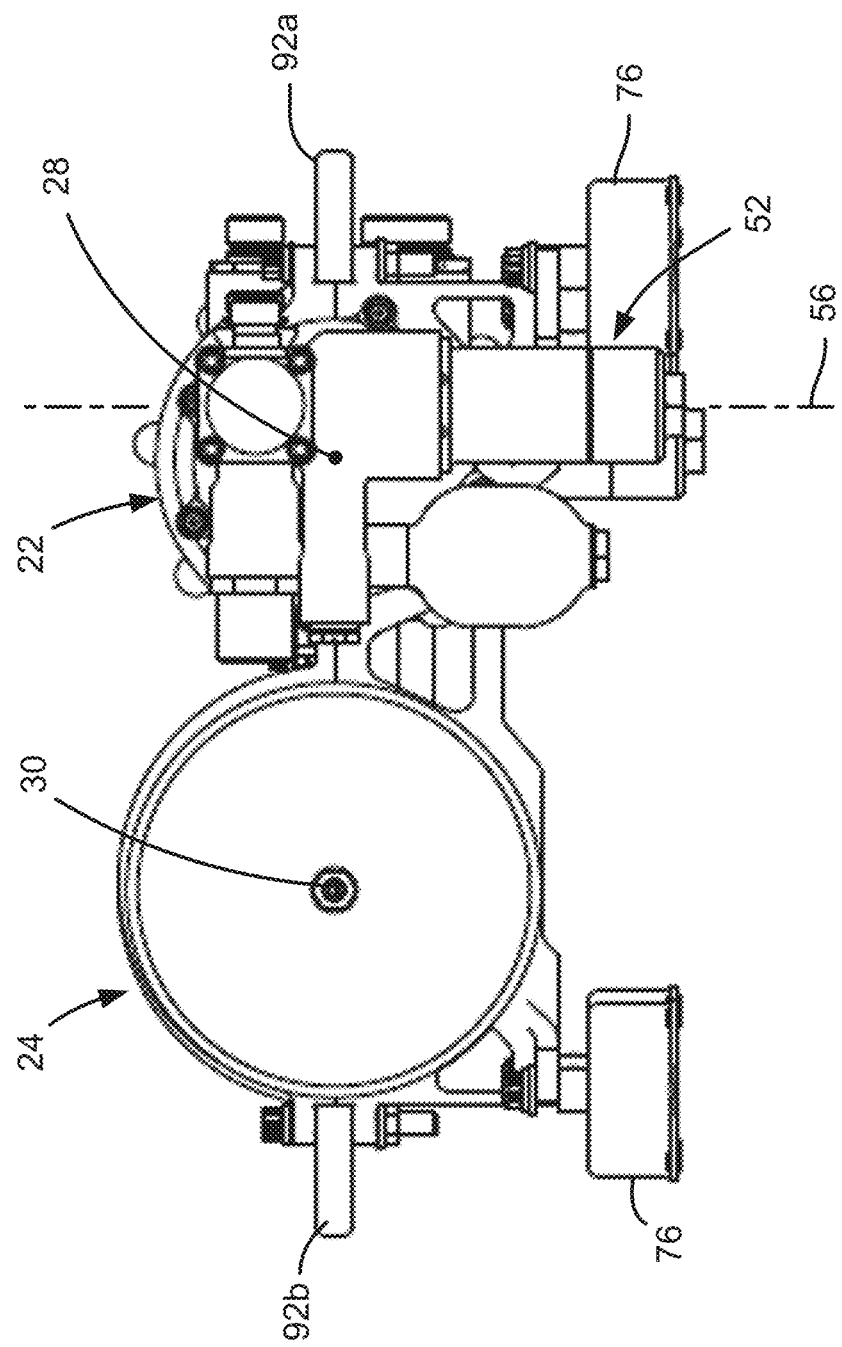
FIG. 4 is a back view of the hydraulic power pack arrangement of FIG. 1.

FIGS. 1-10 depict a hydraulic power pack arrangement 20 (e.g., unit) in accordance with the principles of the present disclosure. The hydraulic power pack arrangement 20 includes a hydraulic power pack core assembly 22 and a hydraulic reservoir assembly 24 coupled together by a mounting bracket arrangement 26. The hydraulic power pack assembly 22 is elongate along a core length L1 (see FIG. 3) that extends along a first axis 28 (see FIGS. 3 and 4). The hydraulic power pack core assembly 22 engages with the mounting bracket arrangement 26 in a manner such that a rotational orientation of the hydraulic power pack core assembly 22 is rotationally adjustable relative to the mounting bracket arrangement 26 about the first axis 28. The hydraulic power pack reservoir assembly 24 provides hydraulic fluid to and from the hydraulic power pack core assembly 22 as needed and is elongate along a reservoir length L2 (see FIG. 3) that extends along a second axis 30 (see FIGS. 3 and 4). The hydraulic reservoir assembly 24 engages with the mounting bracket arrangement 26 in such a manner that a rotational orientation of the hydraulic reservoir assembly 24 is rotationally adjustable relative to the mounting bracket arrangement 26 about the second axis 30.

Figure 11:
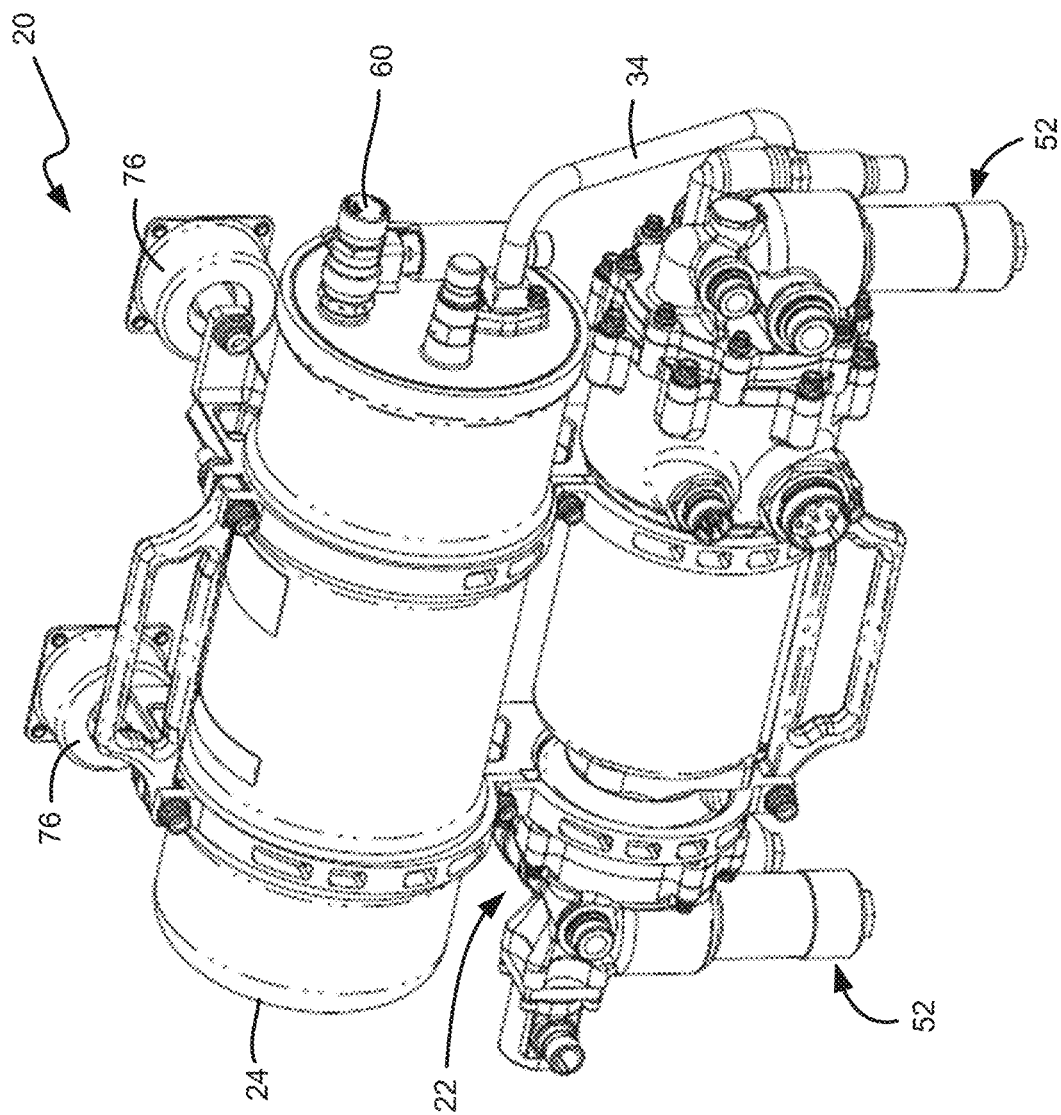
FIG. 11 is a first perspective view of the hydraulic power pack arrangement of FIG. 1 arranged in a wall mount configuration.
Figure 12:
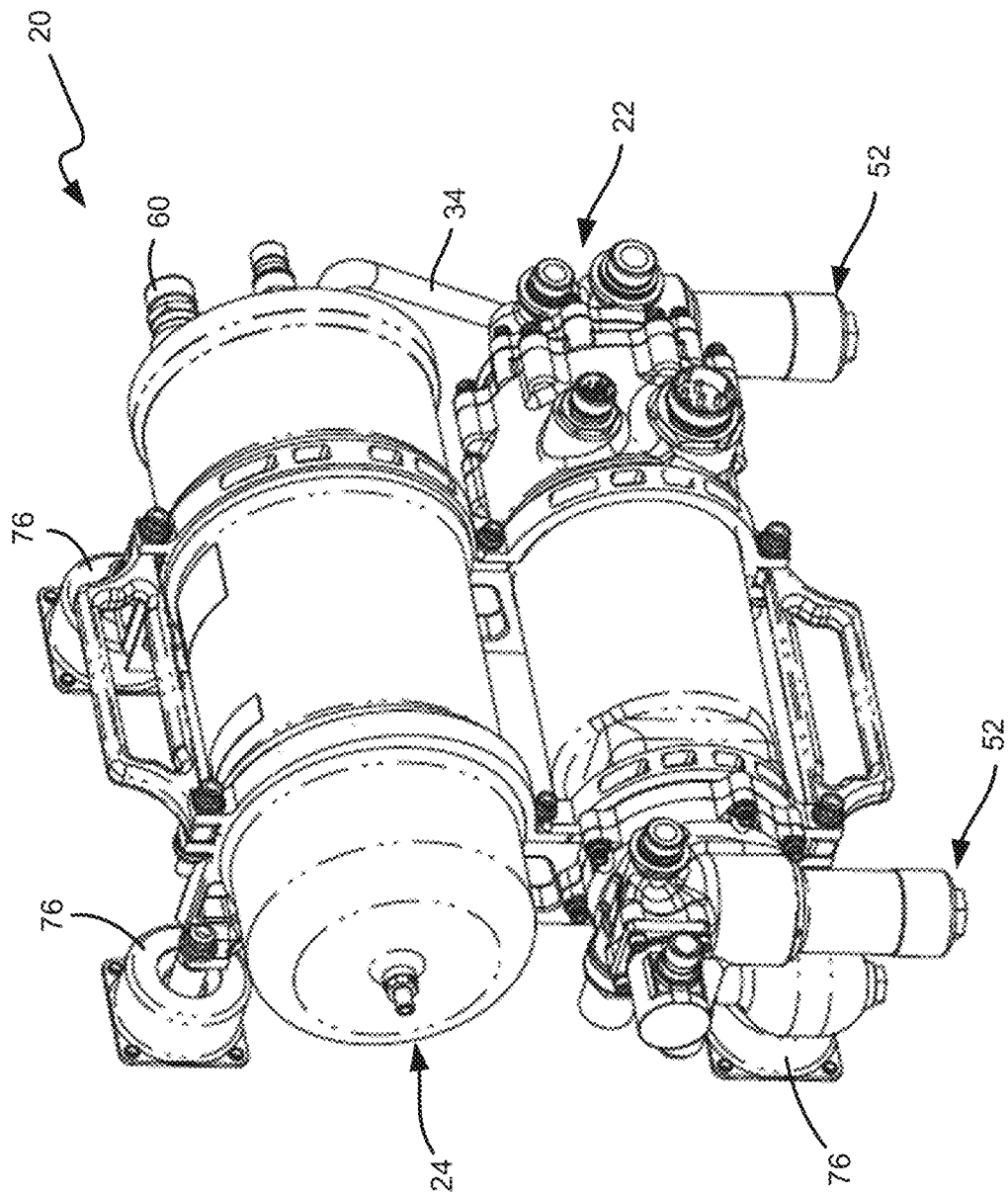
FIG. 12 is an opposite second perspective view of the hydraulic power pack arrangement of FIG. 1 arranged in the wall mount configuration.
Figure 13:
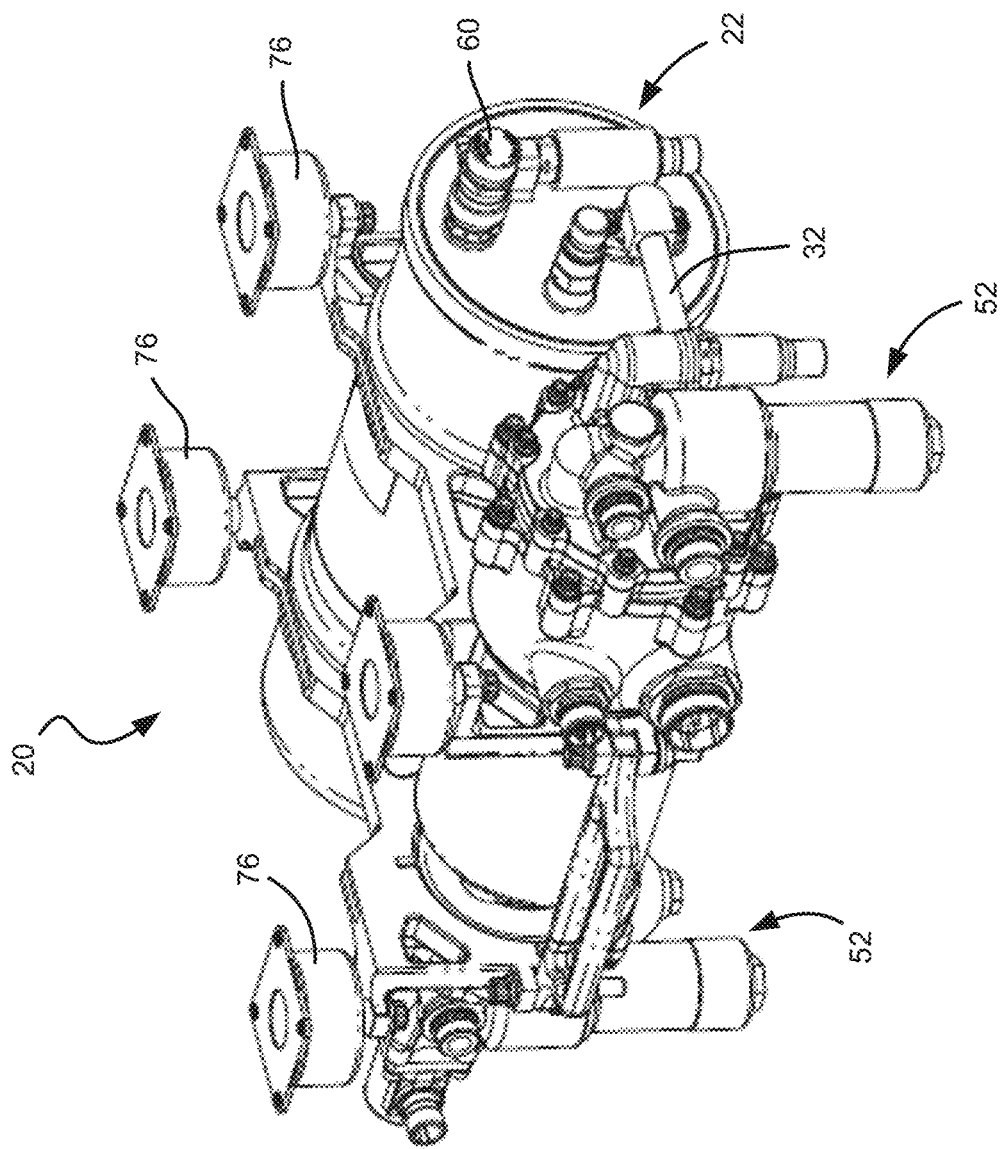
FIG. 13 is a first perspective view of the hydraulic power pack arrangement of FIG. 1 arranged in a ceiling mount configuration.
Figure 14:
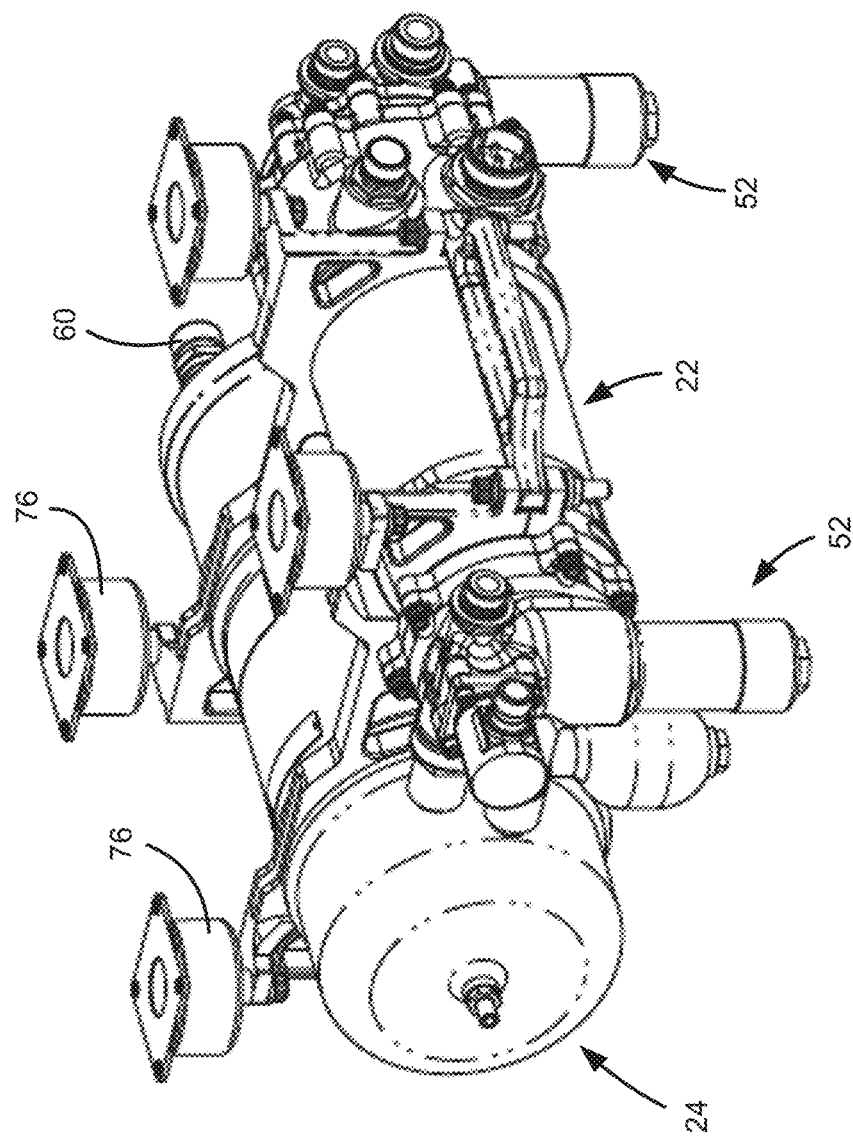
FIG. 14 is an opposite second perspective view of the hydraulic power pack arrangement of FIG. 1 arranged in the ceiling mount configuration.

The rotational adjustability of the hydraulic power pack core assembly 22 and the hydraulic reservoir assembly 24 allows the hydraulic power pack arrangement 20 to be set at multiple different mounting configurations. For example, FIGS. 1-9 show the hydraulic power pack arrangement 20 in a floor mount configuration, FIGS. 11 and 12 show the hydraulic power pack arrangement 20 in a wall mount configuration and FIGS. 13 and 14 show the hydraulic power pack arrangement 20 in a ceiling mount configuration. It will be appreciated that when the mounting bracket arrangement 26 is clamped tightly about the hydraulic power pack core assembly 22 and the hydraulic reservoir assembly 24, the hydraulic power pack core assembly 22 and the hydraulic reservoir assembly 24 are rotationally fixed in place at set rotational orientations about their respective axes 28, 30. However, during initial assembly of the hydraulic power pack arrangement 20, the hydraulic power pack core assembly 22 and the hydraulic reservoir assembly 24 can each be set at a desired rotational orientation with respect to their respective axes 28, 30 prior to tightening of the mounting bracket arrangement 26 to rotationally fix the assemblies 22, 24 with respect to the bracket arrangement 26. Alternatively, after initial assembly of the power pack arrangement 20, the rotational orientations of the assemblies 22, 24 with respect to their respective axes 28, 30 can be adjusted by loosening the mounting bracket arrangement 26, resetting the rotational orientations of the assemblies 22, 24, and then re-tightening the mounting bracket arrangement 26.

Fluid communication is provided between the hydraulic reservoir assembly 24 and the hydraulic power pack core assembly 22 by a hydraulic fluid transfer tube. It will be appreciated that different shapes and sizes transfer tubes can be used depending upon the rotational positioning of the assemblies 22, 24. For example, a first transfer tube 32 (see FIGS. 1, 5 and 13) can be used to provide fluid communication between the assemblies 22, 24 when the hydraulic power pack arrangement 20 is in the floor mount configuration and when the hydraulic power pack arrangement 20 is in the ceiling mount configuration. In contrast, a different second transfer tube 34 (see FIGS. 11 and 12) is used to provide fluid communication between the assemblies 22, 24 when the hydraulic power pack arrangement 20 is the wall mount configuration.

Figure 6:
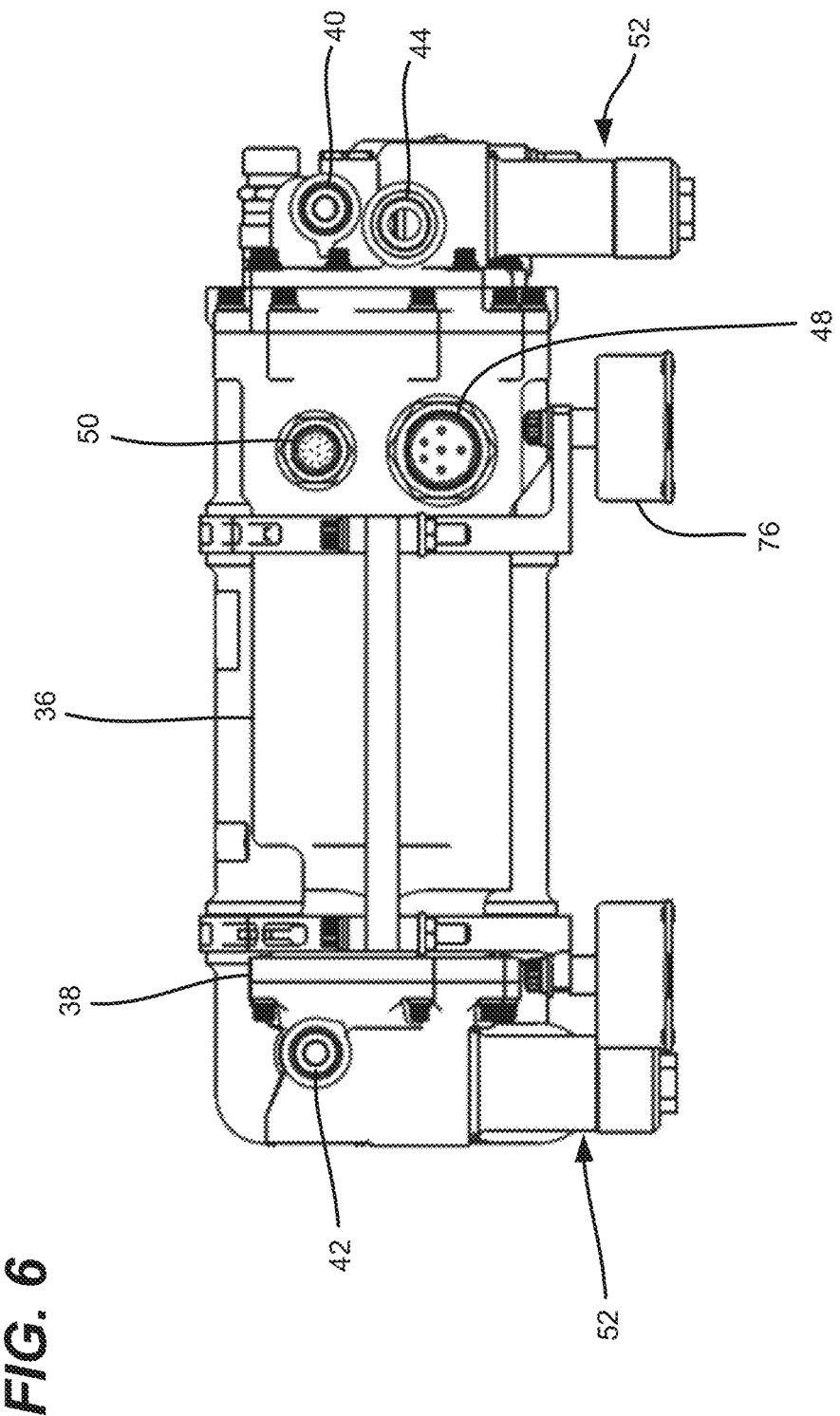
FIG. 6 is a first side view of the hydraulic power pack arrangement of FIG. 1.
Figure 7:
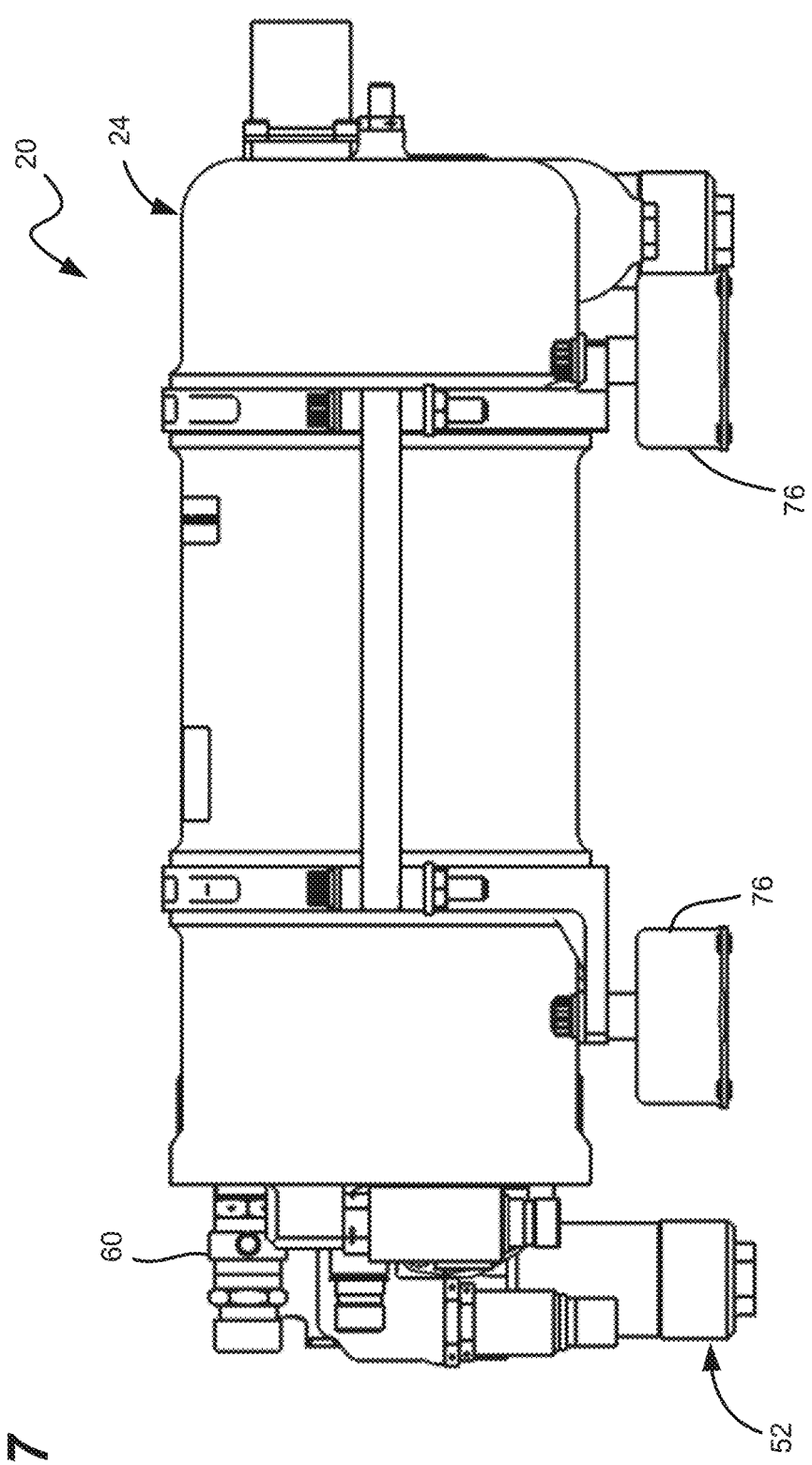
FIG. 7 is a second side view of the hydraulic power pack arrangement of FIG. 1.
Figure 10:
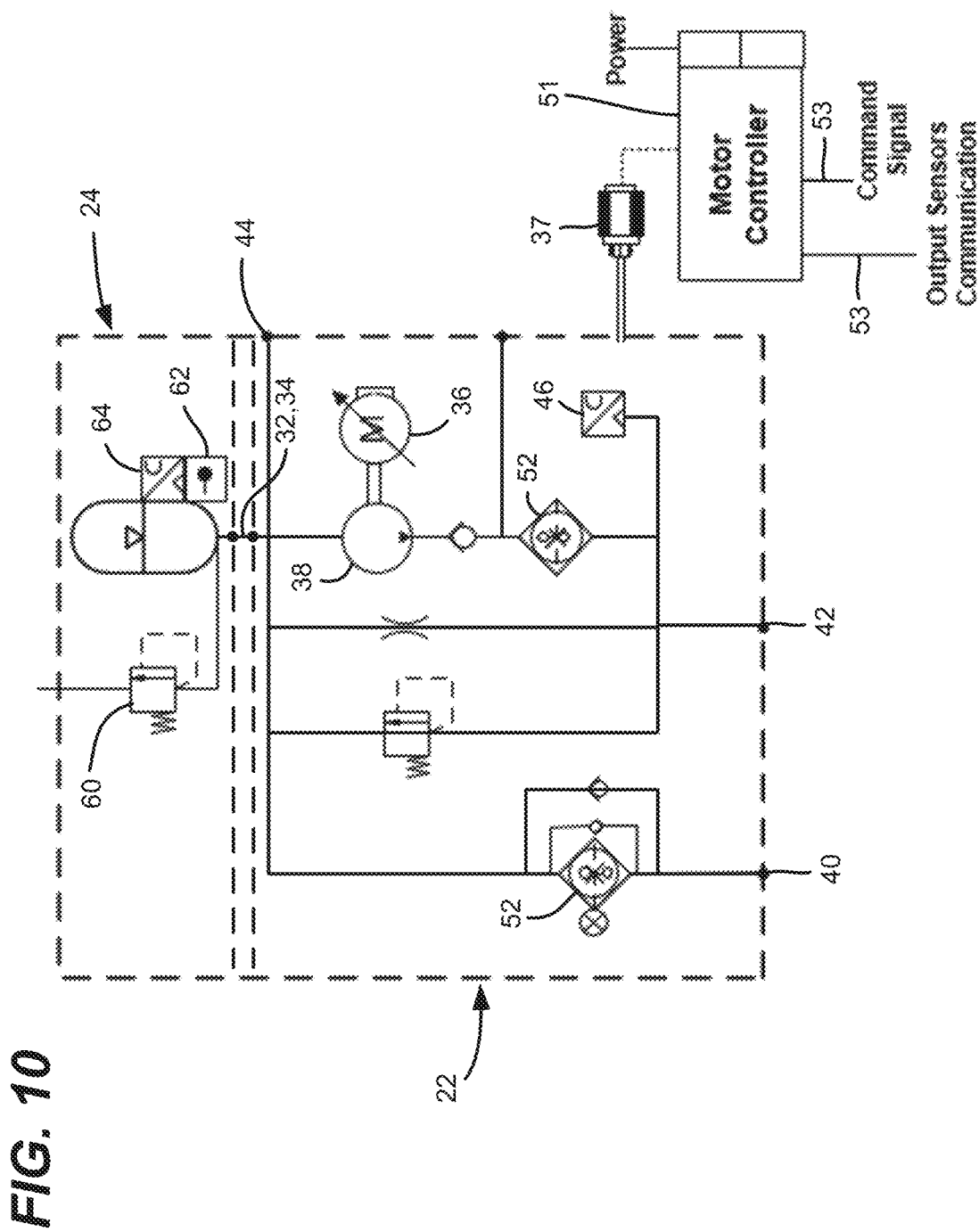
FIG. 10 is a schematic view of the hydraulic power pack arrangement of FIG. 1.

Referring to FIGS. 6 and 10, the hydraulic power pack core assembly 22 includes an electric motor 36 and a hydraulic pump rotating group 38 adapted to be rotated by the electric motor 36. The hydraulic pump rotating group 38 can include a plurality of pistons that reciprocate within cylinders defined by a cylinder block that is rotated by the electric motor 36. It will be appreciated that a drive shaft of the electric motor 36 can be coupled to the cylinder block by a torque transferring connection (e.g. a splined connection, a keyed connection, etc.) and in certain examples the electric motor shaft and the cylinder block are coaxially aligned. In certain examples, the rotating group has an axial piston arrangement, but other pump arrangements (e.g., radial piston pumps, vane pumps, gear pumps, etc.) could also be used. In a preferred example, the electric motor 36 is a wet electric motor in which hydraulic fluid flows through the electric motor housing in a direction along the core length L1 to provide lubrication and cooling of the rotor of the electric motor. As the cylinder block is rotated by the motor, the pistons reciprocate in coordination with the rotation to provide a pumping action by forcing hydraulic fluid through the rotating group from an inlet to an outlet port of the hydraulic power pack core assembly 22. In this way, high pressure fluid is provided at the hydraulic fluid outlet port of the hydraulic power pack core assembly 22.

Referring still to FIGS. 6 and 10, the hydraulic power pack core assembly 22 includes a low pressure port 40 (e.g. a return port) and a high pressure port 42 (e.g., a pump outlet port) adapted to be connected to a hydraulic system including one or more actuators desired be powered by the hydraulic power pack arrangement 20. In certain examples, the actuators can drive structures such as landing gear, primary flight control components, secondary flight control components, cargo doors, brakes, steering or other components present as part of an aircraft. The high-pressure port 42 outputs pressurized hydraulic fluid output from the hydraulic pump rotating group 38, while the low-pressure port 40 receives return flow from the system being powered by the hydraulic power pack arrangement 20. It will be appreciated that hydraulic fluid flow from the low-pressure port 40 is directed axially through the electric motor 36 to a fluid input/inlet of the hydraulic pump rotating group 38. As indicated above, the hydraulic fluid flowing through the electric motor 36 can provide cooling and lubrication of the moving parts of the electric motor 36 (e.g., the rotor). Additionally, since hydraulic fluid is flowing through the electric motor 36 to the pump rotating group, a shaft seal is not required between the electric motor 36 and the pump rotating group 38. The hydraulic power pack core assembly 22 can also include a high-pressure manifold adjacent the high-pressure port 42 and a low-pressure manifold adjacent the low-pressure port 40.

In one example, the hydraulic power pack core assembly 22 also includes a hydraulic port 44 for fluidly connecting the hydraulic power pack arrangement 20 to another hydraulic power pack arrangement, a pressure transducer 46 (see FIG. 1) for sensing the outlet pressure of the hydraulic pump rotating group 38, an electric power port 48 for providing electric power to the electric motor 36 (e.g., from a power cable having a plug 37), and a control port 50 for transferring control feedback or other information that can be communicated to and from a controller 51 (e.g., via a control cable having one or more signal lines 53). The hydraulic power pack core assembly 22 further includes hydraulic filters 52 for filtering the hydraulic flow directed to the inlet side of the hydraulic pump-rotating group 38 and for filtering the hydraulic fluid output from the outlet side of the hydraulic pump rotating group 38. Each of the filters 52 can include a filter canister 54 having a length that extends along a filter axis 56. The filter canisters 54 each have a contaminant collecting end 58 which desirably faces downwardly to facilitate retention of filtered debris adjacent the contaminant collecting end 58 via gravity. A differential pressure sensor 61 or sensors can be used to determine when the filters 52 should be changed. It will be appreciated that alternative hydraulic power pack cores in accordance with the principles of the present disclosure may not include hydraulic fluid filters or one or more other structures/features described above.

The hydraulic reservoir assembly 24 in one example can be configured as an accumulator that may have a preset pressure. In one example, the hydraulic reservoir assembly 24 includes a metal bellows accumulator. The hydraulic reservoir assembly 24 includes a bleed valve 60 for bleeding air from the system, a pressure sensor 64 and a temperature sensor 62. In use of the hydraulic power pack arrangement 20 it is important for the bleed valve 60 to be at or above the hydraulic fluid level of the system (e.g., at the highest point possible in the hydraulic system) to ensure effective bleeding of air through the bleed valve 60. It will be appreciated that the hydraulic reservoir assembly 24 is adapted to supply and receive hydraulic fluid with respect to the hydraulic power pack core assembly 22 as needed during operation of the hydraulic power pack core assembly 22.

Referring to FIG. 6, it will be appreciated that the low-pressure port 40, the high pressure port 42, the hydraulic port 44, the electrical power port 48 and the electrical control port 50 all face in the same direction and are all located and accessible at one single side of the hydraulic power pack care assembly 22.

Orienting the filter canisters 54 with the contaminant collection ends 58 facing downwardly facilitates replacement of the filter canisters 54. Further, due to gravity, the downward orientation of the filter canisters 54 assist in containing debris within the canisters during replacement.

In one example, the mounting bracket arrangement 26 includes mounting feet 71. In one example, the mounting feet 71 can be used to secure vibration isolators 76 to the bracket arrangement 26 (e.g., by fasteners such as bolts). In other examples, the feet 71 can be used to secure the bracket arrangement directly to a mounting location without the use of isolators. In the depicted example, the feet 71 are positioned along a common plane. In other examples, the feet can be arranged in different configurations (e.g., at different heights, facing in different directions, etc.) to correspond to different mounting scenarios. The feet can function as reference features with respect to which the hydraulic power pack core assembly 22 and the hydraulic reservoir assembly 24 can be adjusted by rotational adjustment about their respective axes. In one example, the feet 71 can define a reference plane (not shown). A reference plane 72 can also be defined by the vibration isolators 76.

As indicated previously, it is desirable for the contaminant collection ends 58 of the filter canisters 54 to be orientated in a downward direction when the hydraulic power pack arrangement 20 is mounted within an aircraft. It will be appreciated that by adjusting the rotational orientation of the hydraulic power pack core assembly 22 about the first axis 28, the orientations of the filter canisters 54 can be altered relative to a reference feature such as the reference plane 72. For example, when the hydraulic power pack arrangement 20 is in the floor mount configuration of FIGS. 1-7, the hydraulic power pack core assembly 22 is orientated in a rotational orientation relative to the first axis 28 in which the contaminant collection ends 58 of the hydraulic filters 52 face toward the reference plane 72 and the filter axes 56 are perpendicular with respect to the reference plane 72. In contrast, when the hydraulic power pack arrangement 20 is in the wall mount configuration of FIGS. 11 and 12, the hydraulic power pack core assembly 22 is positioned in a rotational orientation about the first axis 28 in which the filter axes 56 are parallel to the reference plane 72. Further, when the hydraulic power pack arrangement 20 is in the ceiling mount configuration of FIGS. 13 and 14, the hydraulic power pack core assembly 22 is oriented in a rotational orientation about the first axis 28 in which the containment ends 58 of the hydraulic filters 52 face away from the reference plane 72 and the filter axes 56 are perpendicular with respect to the reference plane 72. It will be appreciated that the different rotational orientations are just examples, and that core assembly 22 can be oriented at other rotational orientations about the axis 28 than those specifically depicted depending upon the mounting scenario involved.

In the depicted example, the filters 52 extend through the reference plane 72 when in the floor mount configuration. This is acceptable because at a mounting location within an aircraft, the filters often can extend into a natural recess in the aircraft body and the depicted configuration saves weight and provides a lower center of gravity. However, in other examples, the height of the bracket arrangement and/or the isolators 76 can be adjusted to ensure the filters do not intersect the mounting plane 72 when in the floor mount configuration.

Figure 5:
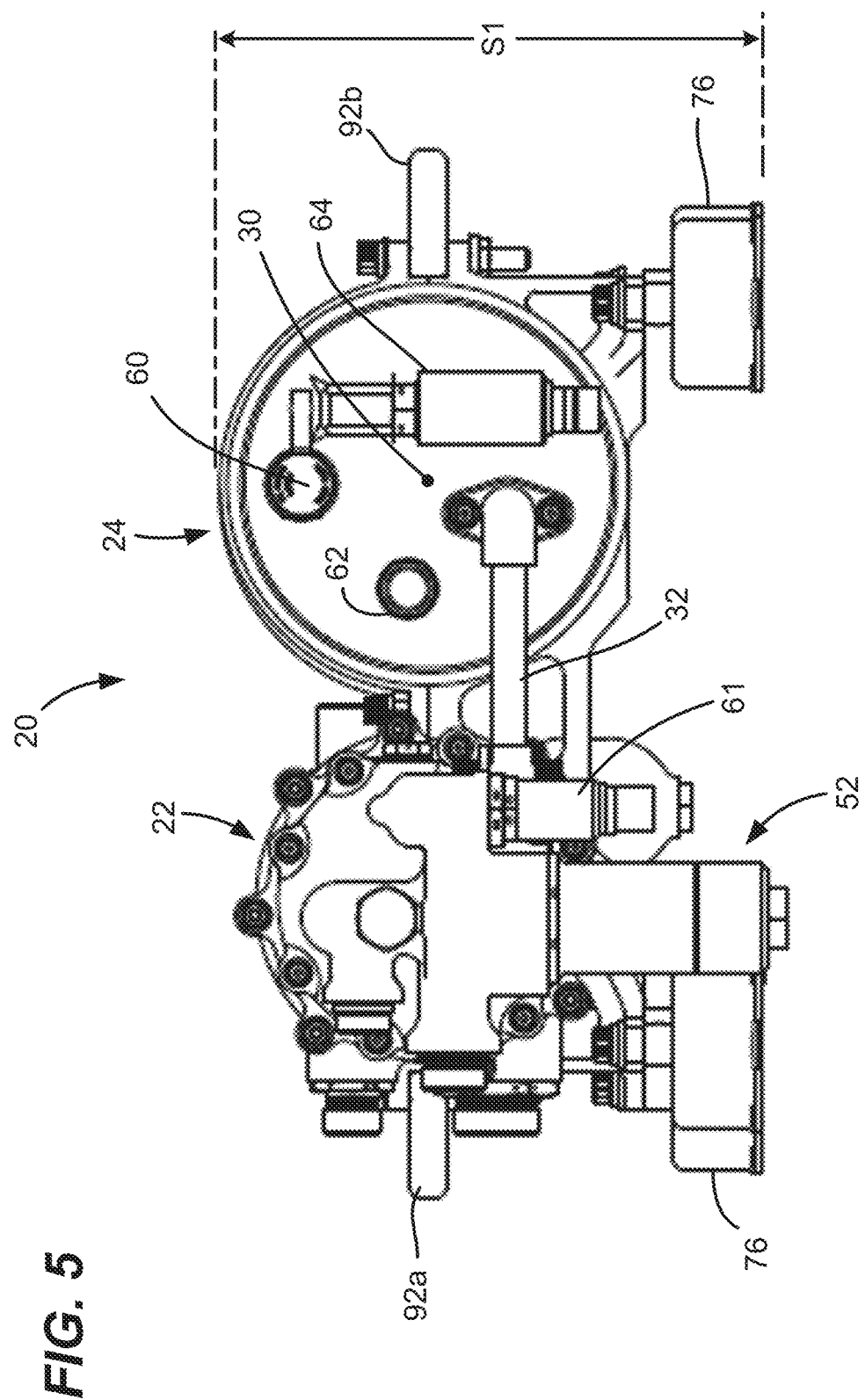
FIG. 5 is a front view of the hydraulic power pack arrangement of FIG. 1.

Referring to FIG. 5, the bleed valve 60 is offset from the second axis 30 of the hydraulic reservoir assembly 24 such that a spacing of the bleed valve 60 from the reference plane 72 can be adjusted by adjusting the rotational orientation of the hydraulic reservoir assembly 24 about the second axis 30. Thus, dependent upon the mounting configuration of the hydraulic power pack arrangement 20, the hydraulic reservoir assembly 24 can be set at different rotational positions about the second axis 30 to ensure that the bleed valve 60 is at or above the highest hydraulic level of the system when the hydraulic power pack arrangement 20 is mounted within an aircraft. For example, when the hydraulic power pack arrangement 20 is in the floor mount configuration of FIGS. 1-7, the hydraulic reservoir assembly 24 can be oriented in a first rotational orientation about the second axis 30 which causes the bleed valve 60 to be positioned at a first spacing Si away from the reference plane 72 which corresponds to a position at or above the highest hydraulic level of the system assuming the bracket arrangement is mounted with the reference plane 72 horizontal. In one example, the spacing Si can be the maximum spacing of the bleed valve 60 from the reference plane 72. When the hydraulic power pack arrangement 20 is in the wall mount configuration of FIGS. 11 and 12, the hydraulic reservoir assembly 24 can be rotated to a second rotational orientation about the second axis 30 to ensure the bleed valve 60 is at or above the highest hydraulic level of the system depending upon the wall mounting conditions encountered. With the hydraulic reservoir assembly 24 in the second rotational orientation, the bleed valve 60 can be spaced a second spacing from the reference plane 72 that is different from the first spacing Si. When the hydraulic power pack arrangement 20 is in the ceiling mount configuration of FIGS. 13 and 14, the hydraulic reservoir assembly 24 can be rotated to a third rotational orientation about the second axis 30 to ensure the bleed valve 60 is at or above the highest hydraulic level of the system depending upon the ceiling mounting conditions encountered. With the hydraulic reservoir assembly 24 in the third rotational orientation, the bleed valve 60 can be spaced a third spacing from the reference plane 72 that is different from the first and second spacings. It will be appreciated that the different rotational orientations are just examples, and that reservoir assembly 24 can be oriented at other rotational orientations about the axis 30 than those specifically depicted depending upon the mounting scenario involved.

As previously indicated, the hydraulic power pack assembly 22 is configured such that the low pressure port 40, the high pressure port 42, the hydraulic port 44, the electrical power port 48 and the electrical control port 50 are all provided at one side of the hydraulic power pack core assembly 22. It will be appreciated that by adjusting the rotational orientation of the hydraulic power pack core assembly 22 about the axis 28, the orientation in which the side faces can be adjusted relative to the reference plane 72 or other reference or mounting feature of the bracket arrangement to maximize accessibility at different mounting scenarios.

In addition to allowing the hydraulic power pack core assembly 22 and the hydraulic reservoir assembly 24 to be rotationally adjusted about the axes 28, 30, the mounting bracket arrangement 26 is also adapted to be compatible with hydraulic reservoir assemblies having different volumes and hydraulic power pack core assemblies having different flow parameters. For example, by designing different hydraulic power pack core assemblies with different lengths and about the same circumference, hydraulic power pack core assemblies with different power ratings and flow characteristics can be designed to fit within the same bracket arrangement. Similarly, hydraulic reservoir assemblies with different lengths and about the same circumferences can be designed with different volumes while remaining compatible with the same mounting bracket arrangement.

Figure 8:
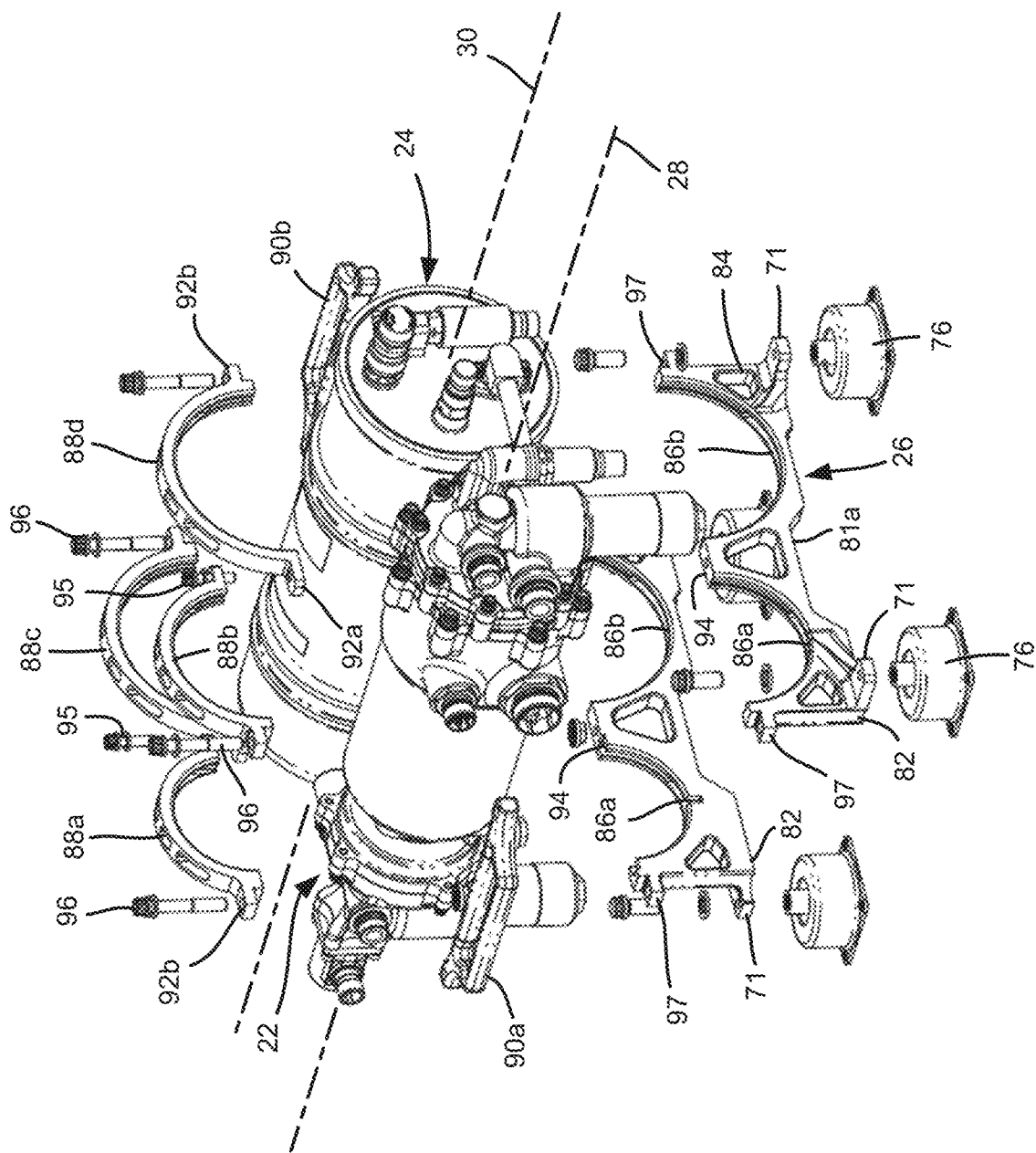
FIG. 8 is a first exploded view of the hydraulic power pack arrangement of FIG. 1.
Figure 9:
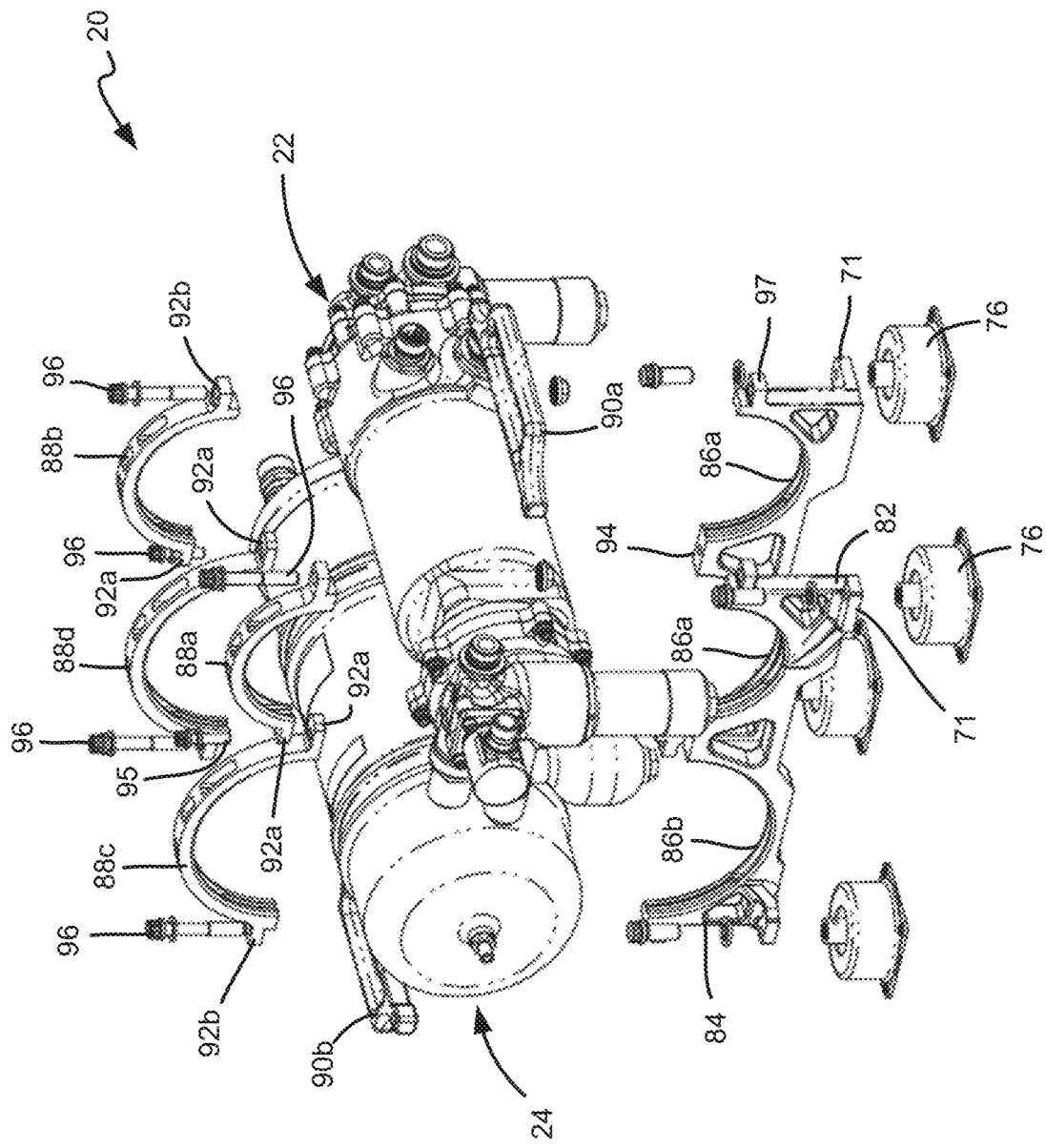
FIG. 9 is a second exploded view of the hydraulic power pack arrangement of FIG. 1.

Referring to FIGS. 8 and 9, the mounting bracket arrangement 26 includes first and second base brackets 80a, 80b each having a length that extends between opposite first and second ends 82, 84. Each of the first and second base brackets 80a, 80b includes first and second saddles 86a, 86b spaced-apart along the length. In the depicted example, the second saddle 86b has a larger cross-dimension (e.g., diameter) than the first saddle 86a. In other examples, the two saddles can be the same size as one another or can have other sizes than those specifically depicted. The first and second brackets 80a, 80b are arranged spaced-apart and parallel with respect to one another with the first saddles 86a aligned along the first axis 28 and the second saddles 86b aligned the second axis 30. The first and second axes 28, 30 are parallel with respect to one another. The mounting feet 71 are located adjacent the first and second ends 82, 84 of the first and second base brackets 80a, 80b. The first and second saddles 86a, 86b have open sides that face away from the mounting feet 71. The mounting feet 71 project outwardly from main bodies of the first and second base brackets 80a, 80b in an orientation perpendicular to the length of the base brackets 80a, 80b.

The bracket arrangement 26 further includes first and second saddle brackets 88a, 88b that fasten to the first and second base brackets 80a, 80b in opposition to the first saddles 86a to clamp the hydraulic power pack core assembly 22 in place within the first saddles 86a. The mounting bracket arrangement 26 also includes third and fourth saddle brackets 88c, 88d that fasten to the first and second base brackets 80a, 80b in opposition to the second saddles 86b to clamp the hydraulic reservoir assembly 24 in place within the second saddles 86b. In certain examples, a first handle 90a is secured to extend between the first ends 82 of the base brackets 80a, 80b and a second handle 90b is secured to extend between the second ends 84 of the base brackets 80a, 80b. In certain examples, the first, second, third and fourth saddles brackets 88a-88d each include inner and outer mounting tabs 92a, 92b. The outer tabs 92b are stepped up from ends of the brackets to provide clearance for the handles 90a, 90b. The inner tabs 92a are not stepped. The inner tabs 92a are secured to saddle spacer sections 94 of the base brackets 80a, 80b by bolts 95. The inner tabs 92a of the brackets 88a, 88c overlap one another when bolted to the spacer section 94 of the base bracket 80b and the inner tabs 92a of the brackets 88b, 88d overlap one another when bolted to the spacer section 94 of the base bracket 80a. The bolts 95 extend through the overlapped tabs 92a. The outer tabs 92b are bolted to stepped tabs 97 at ends 82, 84 of the base brackets 80a, 80b by bolts 96. In the depicted example, the handles 90a, 90b fit between the stepped tabs 92b, 97 and are secured to the first and second base brackets 80a, 80b by the same bolts 96 used to secure the outer stepped tabs 92b to the stepped tabs 97. In other examples, alternative fastening arrangements can be used to secure together the various components. Further, in alternative examples, the bracket shapes and relative positioning can be varied from those specifically described and depicted while still providing similar functionality.

What is claimed is:

1. A hydraulic power pack arrangement comprising:
first and second base brackets each having a length that extends between opposite first and second ends, each of the first and second base brackets including a saddle, the first and second base brackets being arranged spaced apart and parallel with respect to one another with the saddle aligned along a first axis, the first and second base brackets including mounting feet located adjacent the first and second ends of the first and second base brackets, the saddle having an open side that face away from the mounting feet; and
a hydraulic power pack core assembly that is elongate along a core length, the hydraulic power pack core assembly including an electric motor and a hydraulic pump rotating group adapted to be rotated by the electric motor, the hydraulic power pack core assembly being mounted within the saddle of the first and second base brackets with the core length extending along the first axis, wherein a rotational orientation of the hydraulic power pack core assembly is rotationally adjustable relative to the first and second base brackets about the first axis such that an orientation of a component of the hydraulic power pack core assembly can be adjusted relative to a mounting plane defined by the mounting feet of the first and second base brackets;
wherein the component of the hydraulic power pack core assembly is a filter canister, wherein the hydraulic power pack arrangement can be configured in a floor mount configuration, a ceiling mount configuration, and a wall mount configuration, wherein the hydraulic power pack core assembly can be set at different rotational orientations about the first axis to ensure that a contaminant collecting end of the filter canister of the hydraulic power pack core assembly faces downwardly in the floor mount configuration, the ceiling mount configuration, and the wall mount configuration;
wherein the filter canister has a length that extends along a filter axis of the filter canister, and wherein an orientation of the filter axis relative to the mounting plane can be adjusted by adjusting the rotational orientation of the hydraulic power pack core assembly about the first axis;
wherein the filter axis of the filter canister is perpendicular with respect to the mounting plane in the floor mount configuration and in the ceiling mount configuration, and wherein the filter axis is parallel to the mounting plane in the wall mount configuration;
wherein the contaminant collecting end of the filter canister faces toward the mounting plane in the floor mount configuration, and wherein the contaminant collecting end of the filter canister faces away from the mounting plane in the ceiling mount configuration; and
wherein the hydraulic power pack core assembly includes a hydraulic input port for inputting hydraulic fluid to the hydraulic pump rotating group, a hydraulic output port for outputting hydraulic fluid from the hydraulic pump rotating group, and electrical connection ports for powering and controlling the electric motor; wherein outer ends of all of the hydraulic input port, the hydraulic output port, and the electrical connection ports face in one direction.

2. The hydraulic power pack arrangement of claim 1, further comprising first and second saddle brackets that fasten to the first and second base brackets in opposition to the saddle to clamp the hydraulic power pack core assembly in place within the saddle.

3. The hydraulic power pack arrangement of claim 2, wherein the first and second saddle brackets each include sets of first and second mounting tabs that are secured to corresponding first and second sets of mounting tabs of the first and second base brackets by bolts.

4. The hydraulic power pack arrangement of claim 3, wherein handles are secured to the first and second base brackets by the bolts.

5. The hydraulic power pack arrangement of claim 1, further comprising a first handle secured to extend between the first ends of the first and second base brackets and a second handle secured to extend between the second ends of the first and second base brackets.

6. The hydraulic power pack arrangement of claim 1, wherein vibration isolators are secured to the mounting feet.

7. The hydraulic power pack arrangement of claim 1, further comprising a hydraulic reservoir assembly for providing hydraulic fluid to and from the hydraulic power pack core assembly and is elongate along a reservoir length that extends along a second axis; the hydraulic reservoir assembly engages with the first and second base brackets in such a manner that a rotational orientation of the hydraulic reservoir assembly is rotationally adjustable relative to the first and second base brackets about the second axis;
wherein the hydraulic power pack core assembly and the hydraulic reservoir assembly are coupled together by the first and second base brackets.

8. The hydraulic power pack arrangement of claim 7, wherein a first transfer tube can be used to provide fluid communication between the hydraulic power pack core assembly and the hydraulic reservoir assembly when the hydraulic power pack arrangement is in the floor mount configuration or the ceiling mount configuration, wherein a second transfer tube is used to provide fluid communication between the hydraulic power pack core assembly and the hydraulic reservoir assembly when the hydraulic power pack arrangement is in the wall mount configuration.

9. The hydraulic power pack arrangement of claim 7, wherein the hydraulic reservoir assembly includes a bleed valve, and wherein the bleed valve is offset from the second axis of the hydraulic reservoir assembly.

10. The hydraulic power pack arrangement of claim 7, wherein the hydraulic reservoir assembly includes an accumulator having a preset pressure.

11. A hydraulic power pack arrangement comprising:
first and second base brackets each having a length that extends between opposite first and second ends, each of the first and second base brackets including a saddle, the first and second base brackets being arranged spaced apart and parallel with respect to one another with the saddle aligned along a first axis, the first and second base brackets including mounting feet located adjacent the first and second ends of the first and second base brackets, the saddle having an open side that face away from the mounting feet; and
a hydraulic power pack core assembly that is elongate along a core length, the hydraulic power pack core assembly including an electric motor and a hydraulic pump rotating group adapted to be rotated by the electric motor, the hydraulic power pack core assembly being mounted within the saddle of the first and second base brackets with the core length extending along the first axis, wherein a rotational orientation of the hydraulic power pack core assembly is rotationally adjustable relative to the first and second base brackets about the first axis such that an orientation of a component of the hydraulic power pack core assembly can be adjusted relative to a mounting plane defined by the mounting feet of the first and second base brackets;

wherein the component of the hydraulic power pack core assembly is a filter canister, wherein the hydraulic power pack arrangement can be configured in a floor mount configuration, a ceiling mount configuration, and a wall mount configuration, wherein the hydraulic power pack core assembly can be set at different rotational orientations about the first axis to ensure that a contaminant collecting end of the filter canister of the hydraulic power pack core assembly faces downwardly in the floor mount configuration, the ceiling mount configuration, and the wall mount configuration;

wherein the filter canister has a length that extends along a filter axis of the filter canister, and wherein an orientation of the filter axis relative to the mounting plane can be adjusted by adjusting the rotational orientation of the hydraulic power pack core assembly about the first axis;

wherein the filter axis of the filter canister is perpendicular with respect to the mounting plane in the floor mount configuration and in the ceiling mount configuration, and wherein the filter axis is parallel to the mounting plane in the wall mount configuration;

wherein the contaminant collecting end of the filter canister faces toward the mounting plane in the floor mount configuration, and wherein the contaminant collecting end of the filter canister faces away from the mounting plane in the ceiling mount configuration; and wherein the hydraulic power pack core assembly includes a hydraulic input port, a hydraulic output port and electrical connection ports, wherein the hydraulic power pack core assembly defines a lateral side extending parallel to the first axis, and wherein outer ends of the hydraulic input port, the hydraulic output port and the electrical connection ports face outward from the lateral side.

12. The hydraulic power pack arrangement of claim 11, wherein the hydraulic input port and the hydraulic output port are located adjacent to opposite ends of the core length, respectively.

13. The hydraulic power pack arrangement of claim 11, wherein port axes of the hydraulic input port and the hydraulic output port are parallel.

14. The hydraulic power pack arrangement of claim 11, wherein port axes of the hydraulic input port and the hydraulic output port are not coaxial.

15. The hydraulic power pack arrangement of claim 11, wherein port axes of the hydraulic input port and the hydraulic output port are offset from one another, and transversely oriented relative to the first axis.

16. A hydraulic power pack arrangement comprising:
first and second base brackets each having a length that extends between opposite first and second ends, each of the first and second base brackets including a saddle, the first and second base brackets being arranged spaced apart and parallel with respect to one another with the saddle aligned along a first axis, the first and second base brackets including mounting feet located adjacent the first and second ends of the first and second base brackets, the saddle having an open side that face away from the mounting feet;

a hydraulic power pack core assembly that is elongate along a core length, the hydraulic power pack core assembly including an electric motor and a hydraulic pump rotating group adapted to be rotated by the electric motor, the hydraulic power pack core assembly being mounted within the saddle of the first and second base brackets with the core length extending along the first axis, wherein a rotational orientation of the hydraulic power pack core assembly is rotationally adjustable relative to the first and second base brackets about the first axis such that an orientation of a component of the hydraulic power pack core assembly can be adjusted relative to a mounting plane defined by the mounting feet of the first and second base brackets; and a hydraulic reservoir assembly for providing hydraulic fluid to and from the hydraulic power pack core assembly and is elongate along a reservoir length that extends along a second axis; wherein the hydraulic reservoir assembly engages with the first and second base brackets in such a manner that a rotational orientation of the hydraulic reservoir assembly is rotationally adjustable relative to the first and second base brackets about the second axis;

wherein the component of the hydraulic power pack core assembly is a filter canister, wherein the hydraulic power pack arrangement can be configured in a floor mount configuration, a ceiling mount configuration, and a wall mount configuration, wherein the hydraulic power pack core assembly can be set at different rotational orientations about the first axis to ensure that a contaminant collecting end of the filter canister of the hydraulic power pack core assembly faces downwardly in the floor mount configuration, the ceiling mount configuration, and the wall mount configuration;

wherein the filter canister has a length that extends along a filter axis of the filter canister, and wherein an orientation of the filter axis relative to the mounting plane can be adjusted by adjusting the rotational orientation of the hydraulic power pack core assembly about the first axis;

wherein the filter axis of the filter canister is perpendicular with respect to the mounting plane in the floor mount configuration and in the ceiling mount configuration, and wherein the filter axis is parallel to the mounting plane in the wall mount configuration;

wherein the contaminant collecting end of the filter canister faces toward the mounting plane in the floor mount configuration, and wherein the contaminant collecting end of the filter canister faces away from the mounting plane in the ceiling mount configuration; and wherein the hydraulic power pack core assembly and the hydraulic reservoir assembly are coupled together by the first and second base brackets.

17. The hydraulic power pack arrangement of claim 16, wherein a first transfer tube can be used to provide fluid communication between the hydraulic power pack core assembly and the hydraulic reservoir assembly when the hydraulic power pack arrangement is in the floor mount configuration or the ceiling mount configuration, wherein a second transfer tube is used to provide fluid communication between the hydraulic power pack core assembly and the hydraulic reservoir assembly when the hydraulic power pack arrangement is in the wall mount configuration.

18. The hydraulic power pack arrangement of claim 16, wherein the hydraulic reservoir assembly includes a bleed valve, and wherein the bleed valve is offset from the second axis of the hydraulic reservoir assembly.

19. The hydraulic power pack arrangement of claim 16, wherein the hydraulic reservoir assembly includes an accumulator having a preset pressure.

* * * * *